Feb. 9, 1926.

F. W. SEELERT

PISTON RING

Filed Dec. 15, 1922

1,572,690

Inventor
FREDERICK WILLIAM SEELERT
By Paul, Paul & Moore
ATTORNEYS

Patented Feb. 9, 1926.

1,572,690

UNITED STATES PATENT OFFICE.

FREDERICK WILLIAM SEELERT, OF MINNEAPOLIS, MINNESOTA.

PISTON RING.

Application filed December 15, 1922. Serial No. 607,069.

*To all whom it may concern:*

Be it known that I, FREDERICK WILLIAM SEELERT, a citizen of the United States, resident of Minneapolis, county of Hennepin, and State of Minnesota, have invented certain new and useful Improvements in Piston Rings, of which the following is a specification.

This invention relates to piston rings adapted more particularly for use in conjunction with pistons used in internal combustion engines. It is old in this art to provide the external annular face of pistons with one or more circumferential grooves within each of which is seated a piston ring. It is also broadly old in this art to employ piston rings to scrape excess oil from the inner wall of the cylinder. It is also old, so far as this invention is concerned, to bevel sections of the lower face of such a piston ring inwardly and upwardly from its outer edge to provide outer scraping edge portions, inclined oil discharge surfaces and intermediate bearing portions. Piston rings of such type are commonly used to discharge the scraped oil into the piston groove from which it is discharged by a port or ports bored through the piston wall to the interior.

In these types of piston rings it is desirable to obtain as long a scraping edge as possible without limiting the bearing area and thus weakening the ring so that it cannot stand up under working conditions when used with the present high speed piston of internal combustion engines. Such piston rings have been employed with substantially rectangular bearing portions. While these rings provide adequate bearing area so that the ring is not structurally weak, a great disadvantage occurs in that there are left large non-scraping edge sections. An attempt to increase the length of scraping edge has resulted in triangular bearing portions, but such ring has proved impractical in that the bearing portion has been so greatly reduced that the ring is structurally weak.

The structure of this novel ring which has been evolved to overcome these disadvantages is one which provides substantially a maximum bearing area with relation to a maximum discharge area. As the bounding lines of the bearing portions must cooperate with the discharge surface to direct the oil inwardly, the side portions of these bearing areas are preferably convex. In fact it is preferred to define the bearing portion by an arc of a circle so that the bearing portion is substantially crescent-shaped, the inner edge conforming to the curvature of the inner face of the piston ring while the other edge thereof extends in an arcuate convexed curve. Thus, the curved edges of the bearing portions may function to direct the oil inwardly while such curvature relatively provides a greater bearing area than do the angularly shaped bearing portions.

Furthermore, this invention includes the undercutting of the bearing portions to increase the intermediate discharge surfaces. Also, the substantially crescent-shaped bearing portions may be formed of less width than the width of the ring so that a continuous scraping edge is provided whereby the whole cylinder wall may be annularly scraped.

The object therefore of this invention is to provide a new and improved piston ring.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown as various changes may be made within the scope of the claims which follow:

Figure 1:
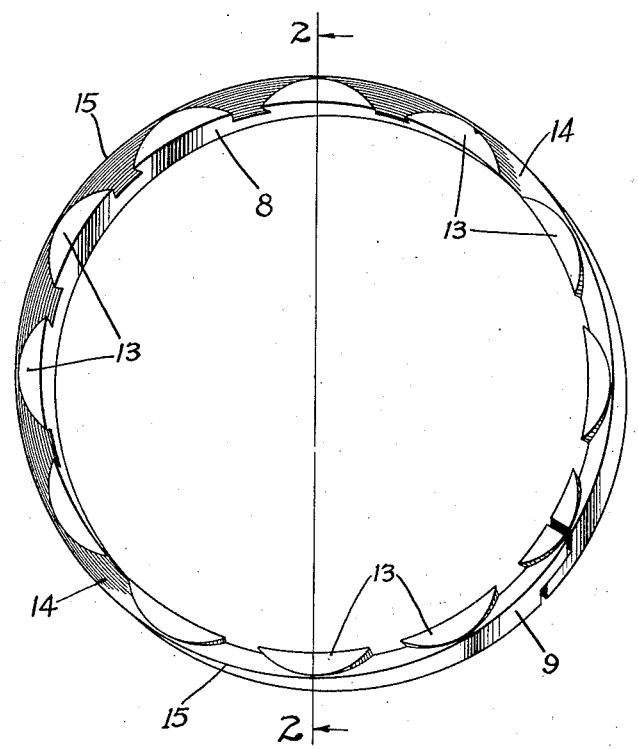
Figure 1 is a perspective view of the novel piston ring with its lower face turned uppermost to show the bearing portion.

In this selected embodiment of the invention there is shown a piston ring 6 which is adapted to be seated in the usual ring groove of a piston 7 so that its inner face 8 is toward the groove and its working outer face 9 is against the inner wall of a cylinder 11. The upper face 12 of the ring is adapted to rest against the upper side of the groove while the lower face is formed to provide spaced bearing portions 13 to rest against the under side of the piston groove. Intermediate the bearing portions are formed the beveled oil discharge portions 14 which afford passage to the groove for oil scraped from the cylinder wall by the outer scraping edge 15. As is usual, one or more ports 16 are bored from the lower inner corner of the groove through the piston so as to form an outlet for the oil scraped and discharged to the groove.

The preferred shape of these novel bearing portions 13, as above noted, is substantially crescent-like. The inner edge of each bearing portion conforms to the curvature of the inner face 8 of the ring while the other edge extends from the inner face of the ring outwardly toward the outer face of the ring in an arcuately convex curve returning to the inner face of the ring. Such an arcuate curve provides the shortest possible side for the area thereby defined. This curvature of the bearing portion sides functions to direct the scraped oil to the groove upon each side of such bearing portions, and, unlike the old rectangular bearing areas, does not destroy the scraping functions of a relatively large portion of the outer edge, and greatly increases the bearing area over that possible to obtain with the old triangular form having equal linear sides so that the structural weakness of that form is overcome.

A milling cutter may conveniently be employed to cut away the metal of the lower face of the ring so as to leave the convexedly curved bearing portions and to form the inwardly and upwardly inclined discharge portions 14.

Figure 2:
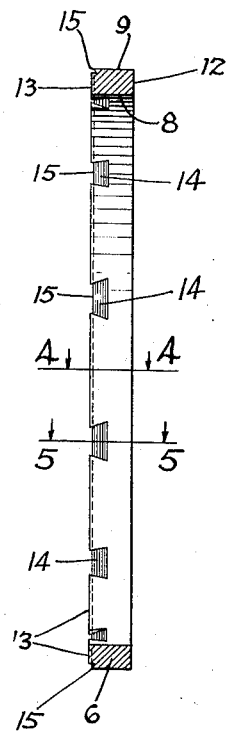
Figure 2 is a vertical section on the line 2—2 of Figure 1.
Figure 3:
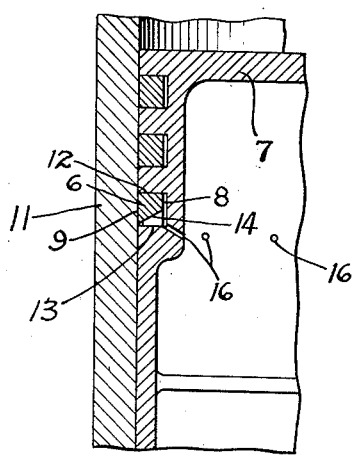
Figure 3 is a vertical sectional view of a portion of a cylinder and piston with the novel ring shown in working position.

The convex side of each bearing portion is also preferably undercut to increase to that extent the surface of the intermediate discharge portions. Such undercutting is clearly shown in Figures 1 and 2 wherein are also shown the substantially dove-tail openings between adjacent bearing portions. This dove-tail shape is simply a result of such undercutting of the bearing portion side or edge. Obviously, such undercutting does not reduce the effective bearing area of the bearing portions and, of course, is useful equally with the present novel shape of bearing portion or with the old angularly shaped forms.

Figure 4:
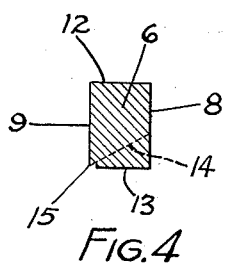
Figure 4 is a vertical sectional view on the line 4—4 of Figure 2 but turned a quadrant to accord with the working position of the ring shown in Figure 3.
Figure 5:
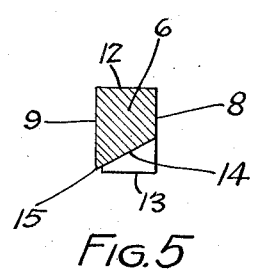
Figure 5 is an enlarged view of the lowest ring as shown in Figure 3, it also being a sectional view on the line 5—5 of Figure 2, and turned similarly to that of Figure 4.

While the working surface of the bearing portions may outwardly extend to the outer scraping edge, it is preferred to make the bearing portions of less width than the width of the ring so as to provide a continuous scraping edge. Continuity of this scraping function assures the removal of the disadvantageous excess oil all around the cylinder wall and does not permit the continual escape of such oil into the explosion chamber with its well-known fouling and carbon-coating result. The old types of rings having non-scraping edge portions permit the passage of such excess oil in a plurality of steady streams. As is shown in Figures 4 and 5, there is a relatively narrow channeled space between the scraping edge and the outer edge of the bearing portions so that the scraped oil may be efficiently directed by the side of the bearing portion to the beveled discharge surfaces and thence to the groove from whence it is delivered by the ports 16 to the interior of the piston.

There is thus provided an improved piston ring which is not only more efficient in its scraping and discharge of excess oil but also in its inherent strength and durability under working conditions.

I claim as my invention:

1. A piston ring having its lower face provided with a plurality of spaced bearing portions and an outer scraping edge whereby the cylinder wall may be scraped, the lower face between the spaced bearing portions being inwardly and upwardly beveled to discharge the scraped oil, and the side portion of the bearing portions being undercut to facilitate the discharge of scraped oil without reduction of bearing area.

2. A piston ring having its lower face provided with a plurality of spaced bearing portions and an outer scraping edge whereby the cylinder wall may be scraped, the lower face between the spaced bearing portions being inwardly and upwardly beveled to discharge the scraped oil, said bearing portions being substantially of crescent shape and each having its inner edge conforming to the curvature of the inner face of the ring and its outer edge extending in an arcuately convex curve of less diameter than the diameter of the ring.

3. A piston ring having its lower face provided with a continuous outer scraping edge annularly to scrape oil from the cylinder wall, a plurality of spaced bearing portions, of less width than the width of the ring, and intermediate inwardly and upwardly beveled surfaces to discharge the scraped oil, the outer edge of the bearing portions being undercut to facilitate oil discharge.

4. A piston ring having its lower face provided with a plurality of spaced bearing portions of less width than the width of the ring, and a continuous scraping outer edge whereby the whole cylinder wall may be annularly scraped, the lower face being inwardly and upwardly beveled to discharge the scraped oil, and the outer edge of each bearing portion being convexly curved to facilitate oil discharge, and said convex outer edge being undercut to facilitate the discharge of scraped oil without reduction of bearing area.

In witness whereof, I have hereunto set my hand this 12th day of December 1922.

FREDERICK WILLIAM SEELERT.